(12) United States Patent
Luckett

(10) Patent No.: US 7,805,885 B2
(45) Date of Patent: Oct. 5, 2010

(54) GREEN ROOF PLANTER

(76) Inventor: Kelly William Luckett, 3713 Philip Meadows Ct., Florissant, MO (US) 63034

( * ) Notice: Subject to any disclaimer, the term of this patent is extended or adjusted under 35 U.S.C. 154(b) by 1576 days.

(21) Appl. No.: 11/018,237

(22) Filed: Dec. 21, 2004

(65) Prior Publication Data

US 2005/0120645 A1 Jun. 9, 2005

Related U.S. Application Data

(63) Continuation-in-part of application No. 10/731,386, filed on Dec. 9, 2003, now abandoned.

(51) Int. Cl.
*A01G 9/02* (2006.01)
(52) U.S. Cl. ...................................... 47/65.9
(58) Field of Classification Search ............ 47/65.9, 47/66.5, 66.1, 66.6, 86, 87, 18, 65.5, 65.7, 47/66.3, 66.4, 66.2, 33, 66.7; 52/173.3; 136/244, 136/291
See application file for complete search history.

(56) References Cited

U.S. PATENT DOCUMENTS

| | | | | |
|---|---|---|---|---|
| 5,595,021 | A | * | 1/1997 | Ripley et al. ............ 47/66.5 |
| 5,746,839 | A | * | 5/1998 | Dinwoodie ............. 136/251 |
| 6,134,834 | A | * | 10/2000 | Ripley et al. ............ 47/86 |
| 6,606,823 | B1 | * | 8/2003 | McDonough et al. ....... 47/65.9 |

OTHER PUBLICATIONS

American Builders & Contractors Supply Co., Inc. Benefits of the GreenGrid System [online], [retrieved on Jun. 21, 2004]. Retrieved from the Internet: <URL: http://www.greengridroofs.com/Pages/benefits.htm>.
American Builders & Contractors Supply Co., Inc. Frequently Asked Questions [online], [retrieved on May 10, 2004]. Retrieved from the Internet: <URL: http://www.greengridroofs.com/Pages/faq.htm>.
American Builders & Contractors Supply Co., Inc. The Innovative GreenGrid System [online], [retrieved on Jun. 21, 2004]. Retrieved from the Internet: <URL: http://greengridroofs.com/Pages/system.htm>.
American Hydrotech, Inc. Garden Roof Assembly [online], [retrieved on Jun. 21, 2004]. Retrieved from the Internet: <URL: http://hydrotechusa.com/gr_home.htm>.
Earth-house Roof Garden [online], [retrieved on Jun. 21, 2004]. Retrieved from the Internet: <URL: http://www.earth-house.com/pitgreenhouse/roof_garden/roof_garden.html>.
Greenroofs.com. The Greenroof Directory [online], [retrieved on Jun. 21, 2004]. Retrieved from the Internet: <URL: http://www.greenroofs.com/premium.php?sid=1>.

* cited by examiner

*Primary Examiner*—T. Nguyen
(74) *Attorney, Agent, or Firm*—Polster Lieder Woodruff & Lucchesi LC

(57) ABSTRACT

A roof planter comprising a body capable of placement upon a roof, a pad in association with the body, growth medium, and vegetation in association with the growth medium. The pad is composed of a material that is compatible with the surface of the roof, and is positioned between the body and the roof, the body retaining the growth medium when the roof planter is placed upon a roof. The roof planters are configured so as to enable the nesting of one roof planter within another.

14 Claims, 7 Drawing Sheets

ISOMETRIC VIEW

CROSS SECTION

PLAN VIEW

Sheet Metal Pattern Layout

Photo: Completed Roof planter

Photo: Plants to be used in my invention Roof planters

GREEN ROOF PLANTER

CROSS REFERENCE TO RELATED APPLICATIONS

This application is a continuation-in-part of U.S. application Ser. No. 10/731,386, filed Dec. 9, 2003, now abandoned for the invention of Kelly William Luckett entitled "Green Roof Blocks," and derives and claims priority from that application.

STATEMENT REGARDING FEDERALLY SPONSORED RESEARCH OR DEVELOPMENT

Not Applicable.

BACKGROUND OF THE INVENTION

Green roofs, roof gardens, eco-roofs all refer to the planting of vegetation on the roof surface of building structures. The principle of green roofs has been widely used in Europe for several decades. Roof top vegetation substantially reduces storm water run off, solar heat gain, and thermal transfer through the roof. In addition, large vegetated surfaces help to replenish oxygen through photosynthesis. Though the benefits are many, the typical green roofs costs are several times that of most roofing systems. The high price of typical green roof construction emanates from costly waterproofing procedures, extensive drainage layers, soil of depths ranging from eight inches to twenty four inches, and additional required structural construction to support resulting increased weight. Repairs to the roofing membrane are extremely expensive due to the large quantities of material that must be moved to access the waterproofing layer.

Each roofing manufacturer markets and sells roofing material of differing compositions, and each manufacturer offers warranties on its new roofing material. During construction of a roof, it is often desirable and/or necessary for the laborers to tread upon newly laid roofing. To minimize trauma to the newly laid roofing and to prevent the voiding of warranties on the newly laid roofing, each manufacturer markets and sells walk pad material that can be placed upon the newly laid roofing to allow laborers to walk atop the newly laid roofing with minimal damage and without voiding the roofing manufacturer's warranties. Each roofing manufacturer's walk pad is composed of material specifically engineered for use on that same manufacturer's roofing material. The use of any other walk pad or any other material on the roof risks damage to the roofing material and voiding of the manufacturer's warranty. This can present a major obstacle to the acceptability of green roof systems.

BRIEF DESCRIPTION OF THE SEVERAL VIEWS OF THE DRAWINGS

The illustrative embodiments of the present invention are shown in the following drawings which form a part of the specification.

Corresponding reference characters indicate corresponding parts throughout the several views of the drawings.

DETAILED DESCRIPTION OF INVENTION

Figure 1:
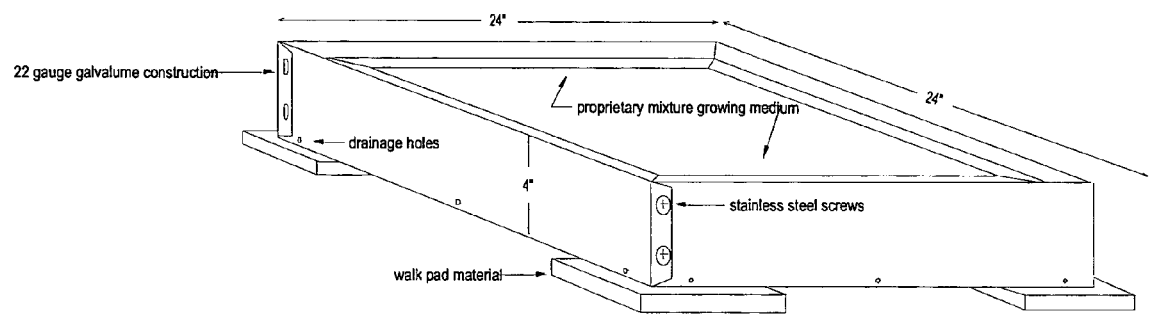
FIG. 1 is a perspective view of an embodiment of the roof planter of the present invention having generally straight sidewalls.
Figure 2:
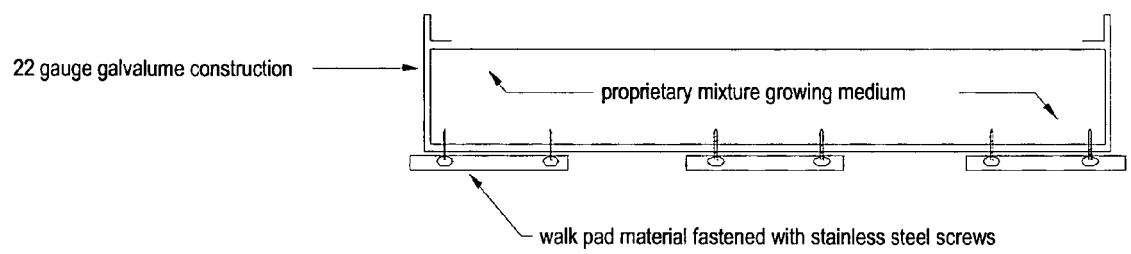
FIG. 2 is a cross-sectional view of an embodiment of the roof planter of the present invention having generally straight sidewalls.
Figure 3:
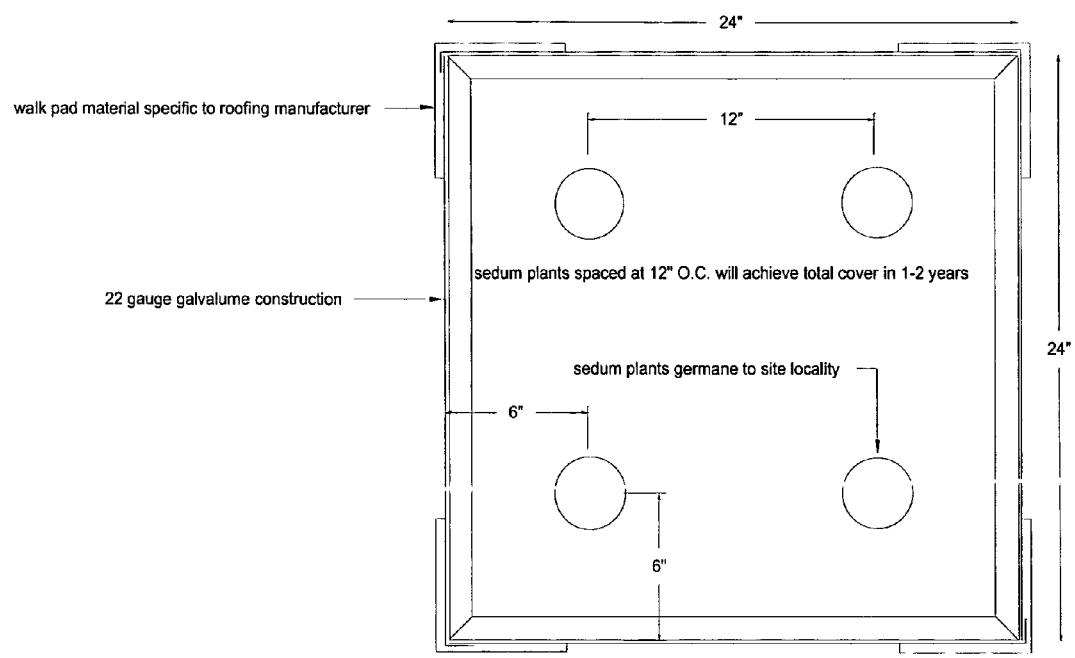
FIG. 3 is a top plan view of an embodiment of the roof planter of the present invention having generally straight sidewalls, showing potential locations for vegetation within said roof planter.
Figure 4:
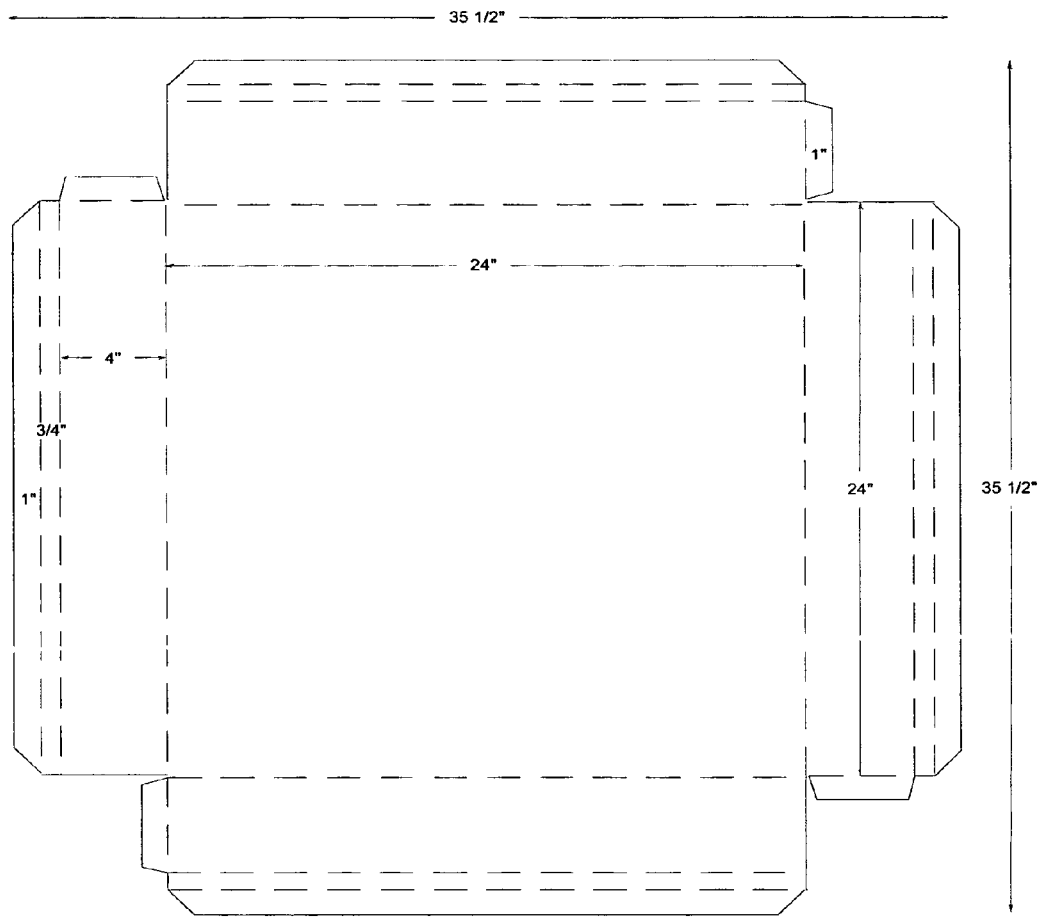
FIG. 4 is a top plan view of a sheet-metal blank used to form a roof planter in an embodiment of the present invention having generally straight sidewalls.
Figure 5:
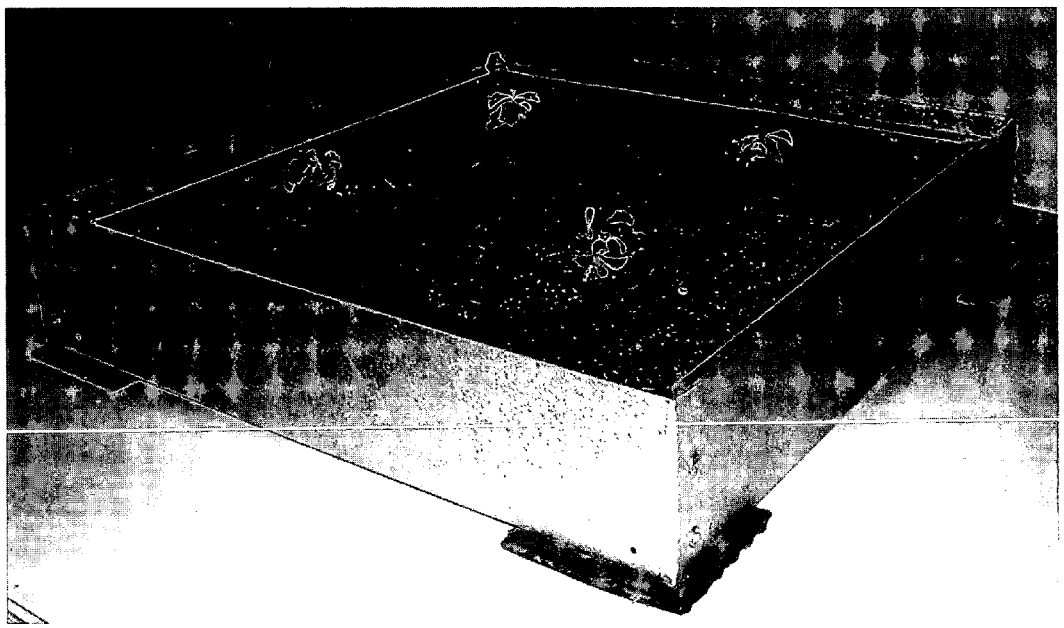
FIG. 5 is a perspective view of a modified roof planter of the present invention having generally straight sidewalls, including growth medium and vegetation.
Figure 6:
FIG. 6 is a perspective view of sedum kamtschaticum plants that can be used as the vegetation in the roof planter of the present invention.

In an illustrative embodiment of the present invention, sedum kamtschaticum plants are housed in 24-inch square, self-contained units. The units, which are containers, can easily be placed on the roof providing quick and inexpensive installation of green roof vegetation. The system weight is between 12 and 18 pounds per square foot, well within the dead load capacity of most building roof structures. Each unit weighs between 50 and 75 pounds, depending on the level of water saturation, and can be easily moved to access the roof membrane for repair. In the event of soil-based plant disease, contamination is contained within the unit allowing for the replacement of only the affected unit. This simple roof greening methodology can be used in conjunction with typical roofing systems, on typical building structure, allowing building owners to realize the benefits and cost savings of a green roof for a fraction of the cost of typical green roof construction.

In this embodiment, the roof planters are constructed as a self-contained roof greening product made from the following components: organic soils, mineral particulate, Sedum Kamtschaticum plants, 22 gauge galvalume sheet metal, stainless steel screws, rubber composite roofing walk pad material. A container constructed of 22 gauge galvalume sheet metal sized 24 inches by 24 inches and 4 inches in depth, is filled with 80% mineral (haydite) and 20% organic growth medium, and four sedum kamtschaticum seedlings are planted six inches from each side.

The box construction is fabricated from flat sheet metal material cut from a 35.5 inch square section. Though the product is prepared for fabrication utilizing a custom machined punch press to cut the desired shape, the following procedure can be used to cut the material by hand using a pair of quality tin snips. Lines at one inch, one and three-quarter inches, and five and three quarter inches are etched from all four edges. The four corners are cut off at a 45-degree angle starting at six and three quarter inches from each corner. One side of the line etched at five and three quarter inches is cut to the perpendicular intersection of the adjacent line etched at five and three quarter inches. This step is repeated on one line only for all four sides. A one-inch tab is etched along the side of the five and three quarter inch line that was not previously cut in the prior step. This tab extends from the intersection of the five and three quarter inches lines to the one and three quarter inches line. The short ends of the tabs are trimmed at an angle to the intersection of the five and three quarter inches lines and to the intersection of the five and three quarter inches lines and the one and three quarter inches lines. Four final three quarter inch long cuts are made along the five and three quarter inches lines to the angled tab cut made in the previous step.

The sheet metal is now ready for bending on a sheet metal box forming brake. Beginning at each outer etched line, bends are made as follows. The one-inch line is bent to ninety degrees, the one and three quarter inch line is bent in the opposite direction to the capacity of the brake. This bend is then squeezed in the clamping head of the brake to form 180-degree fold. These steps are repeated for all four sides. The bends along the five and three quarter inches lines are then formed to 90 degrees in the direction of the one and three quarter inch bend. These four bends form the sides of the container. The one inch tabs are then folded around each corner and fastened using two one inch self tapping stainless steel screws.

Three one-eighth-inch diameter drainage holes, one at each end and one in the center, are then drilled along the bottom of each side just above the bend. Five-inch by five-inch sections of rubber composite roofing walk pad are the fastened to the bottom of the container. One pad is positioned at each corner, extending beyond the container sides one half inch on the outer edges. A fifth pad is positioned in the center of the container. The pads are fastened with the dimples facing downward using four one inch, self-tapping, stainless steel screws per pad. The screws are positioned between dimples and counter sunk into the walk pad material. The growth medium is then filled to a depth of three and one half inches and the seedlings are planted burying the roots and covering the stem by one inch.

The present invention is a completely unique approach to covering the surface of rooftops with vegetation. The embodiments using self-contained, durable 22 gauge galvalume sheet metal material containers, which can be easily installed and moved, differ from anything currently available in the marketplace. Much heavier plastic or polypropylene containers are currently on the market with limited success. These embodiments require no machinery to lift, nor any particular training to install. The use of rubber composite walk pad material as resting pads assures roofing system compatibility and warranty integrity. Thus no additional materials are required to separate the container from the roofing system. In fact, the walk pad material can be procured from different roofing system manufacturers allowing the roofing system manufacturer to provide a material acceptable to come in contact with the roofing material. This ease of use, choice of material and configuration, and system compatibility is unique to the present invention.

This embodiment may further be described as the fabrication of a sheet metal container with roofing system compatible pads on the bottom and planted with drought resistant vegetation to be used for the purpose of economically covering roofs with vegetation, using 22 gauge galvalume sheet metal for the container of the modular roof greening products. Significantly, the use of roofing system specific walk pad material, procured from various manufactures, as the material the container rests on that comes in physical contact with the roofing system, affords roof system compatibility and warranty integrity unique to my invention.

In another illustrative embodiment of the present invention (FIG. 7), the roof planter 100 comprises a body 102, five pads 104, a growth medium 106 placed within the body 102, and vegetation 108 (not shown) planted in the growth medium 106. The body 102 is formed in the shape of a generally flat box having a base 110 and sidewalls 112. In this embodiment, all of the pads 104 are attached to the underside of the base 110, and stainless steel screws 105 secure the pads to the base (FIG. 8). The pads 104 are each generally square in shape.

Of course, the exact number of pads 104 used in each embodiment may vary. For instance, in some applications it may only be desirable to use a single pad 104, while in other applications, a larger number of pads 104 may be desirable. Hence, the number of pads 104 used may vary from a single pad to as many as the user may deem appropriate for the specific application. Further, other methods of attaching the pads 104 to the base 110 may be used. Such other methods include but are not limited to adhesives, rivets, bolts, slides, hinges, and nails, as well as other methods that would be readily apparent to one of ordinary skill in the art. Further, it may not be necessary in all applications to attach the pads 104 to the base 110. The pads 104 may instead be placed between the body 102 and the roof (not shown) upon which the roof planter 100 is set. Alternately, the pads 104 may be attached to the roof and the body 102 can then be set upon the pads. The pads 104 may also be formed in a variety of shapes, such as oval, round, hexagonal or polygonal. The pads 104 may be of uniform or non-uniform dimensions, including thickness. The pads 104 may be perforated, may comprise surface features such as abrasions, pits, and extrusions.

Figure 7:
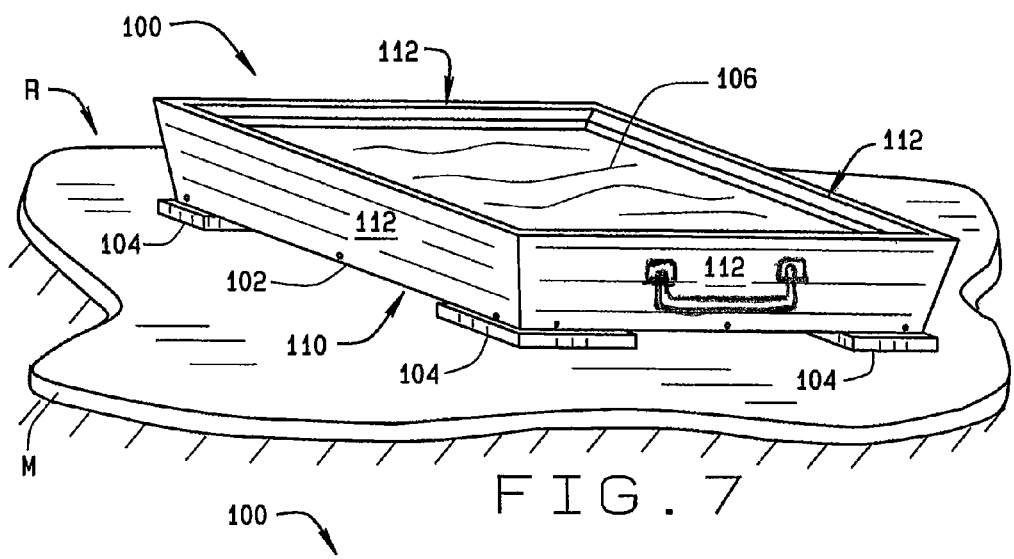
FIG. 7 is a perspective view of an embodiment of the roof planter of the present invention having tapered sidewalls and positioned on a portion of roof.
Figure 8:
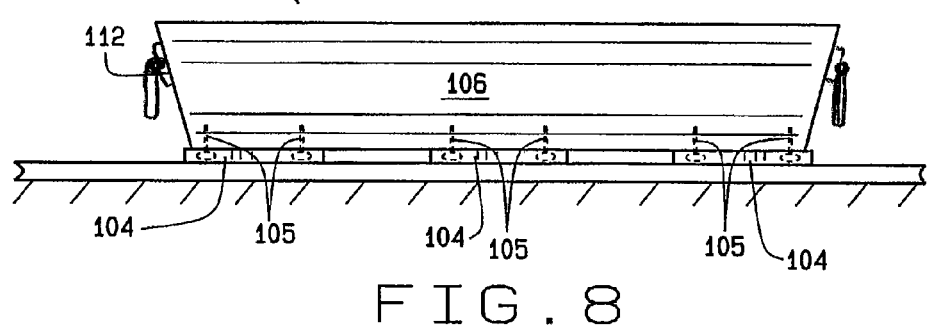
FIG. 8 is a cross-sectional view of an embodiment of the roof planter of the present invention having tapered sidewalls and positioned on a portion of roof.

In modified roof planter 100 (FIG. 7), four of the pads 104 are attached one to each of the four corners of the base 110 and positioned such that a portion of each pad 104 extends beyond the outer edge of the base 110 (FIG. 7). The fifth pad 104 is attached generally to the center of the underside of the base 110 (see FIG. 8). Of course, the location of each pad in this embodiment is merely preferential. The pads 104 may be located in any number of locations on the roof planter 100.

The roof planter 100 may be placed upon a suitable roof R (see FIGS. 7, 8), where the roof R is covered at least in part by a surface membrane M of roofing material having a known surface composition. The roof R may be flat or may be pitched. The pads 104 are constructed from walk pad material specifically chosen to be compatible with the roofing material upon which the particular roof planter will rest. Generally, a specific roofing material manufacturer will identify specific walk pad materials that can be used upon that manufacturer's roofing material without voiding the manufacturer's warranty. Such walk pads have properties that result in an acceptable level of chemical and physical wear to the manufacturer's roofing material. Typically, each roofing material manufacturer will offer walk pads for use on its own roofing products. Preferably, the pads 104 will be constructed of a material that is certified, or at least recognized or otherwise approved, by specific roofing material manufacturers to be compatible with specific roofing materials.

For example, should the roof planter 100 be slated for placement atop a roof having Firestone Building Products ("Firestone") roofing material, then the pads 104 for that specific application would be constructed of walk pad material produced by Firestone, or in the alternative, the pads 104 could be constructed of any other material specifically approved for such use by Firestone. Alternately, the pads 104 may be compatible if they are constructed of a material that imparts minimal chemical degradation or physical wear to the roofing material, even if the pads 104 are not recognized or certified by any roofing material manufacturer.

Figure 9:
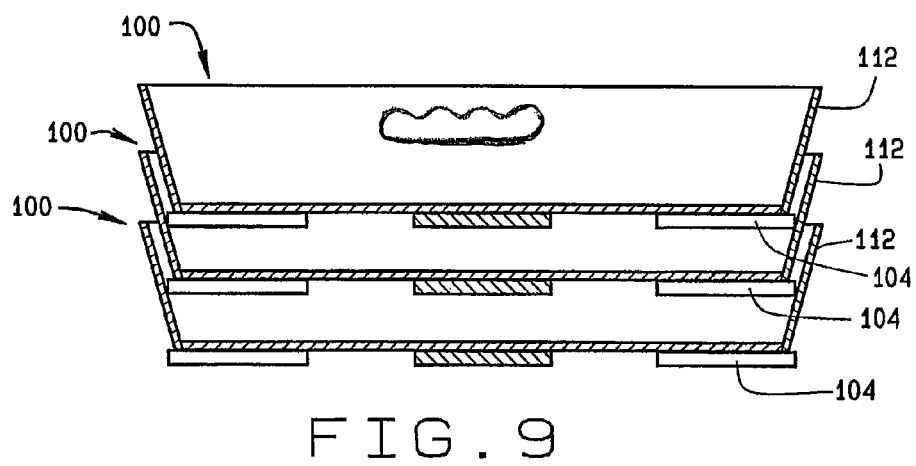
FIG. 9 is a perspective view of multiple roof planters of the present invention nested together.

The sidewalls 112 of the roof planter 100 taper outward from where the sidewalls 112 attach to the base 110. Thus, the perimeter formed by the top edge of the sidewalls 112 is greater in both length and width than the perimeter formed by the sidewalls 112 about the outer edge of the base 110. (FIGS. 7, 8). This shape enables a roof planter 100 to nest within other roof planters of similar dimensions. (FIG. 9). Of course, a number of differing shapes and dimensions may be used for the construction of the sidewalls 112 to achieve the desired ability of the roof planters 100 to nest within each other. For example, the sidewalls 112 may all be vertical up to a given level, but may thereafter form outwardly directed steps or taper outwardly from the straight portions of the sidewalls to enable the nesting of the roof planters 100. In this way, only a portion of the sidewalls 112 of a first roof planter 100 will nest within a second roof planter 100. Further, it is not necessary that all of the sidewalls 112 be tapered or flared to enable the desired nesting. Nesting may be achieved if only one or more of the sidewalls 112 tapers outwardly. In addition, the sidewalls 112 may comprise extensions that step or taper outward from the top of the roof planter 100 and extend upward to accept and retain other roof planters 100.

Additional variations on the basic construction are also available. For example, the exact shape and size of the roof planter 100 can be varied to form larger or smaller roof planter configurations. The body 102 may be flat, such as a straight sheet of metal, or the body 102 may be shaped in all three dimensions, for example taking the shape of a box, a tube, or a cup. Hence the roof planter 100 may be a shape other than square, such as rectangular, round, oval, or any other shape desired by the user. The body 102 of the roof planter 100 may be constructed of a variety of materials, including but not limited to various metals, plastics, ceramics, wood, or any other suitable material that will provide sufficient structural integrity for the planter 100. Each dimension of the roof planter 100, and thereby all of its components, may be of varying sizes. The roof planter 100 may be formed of solid material, or material having holes, slits or other openings, or may be formed of materials such as mesh or fencing, so long as the components of the roof planter 100 have sufficient structural integrity to perform the functions outlined in this disclosure. Of course, one of ordinary skill in the art will recognize that structural members may be added to strategic positions on or in the roof planter 100 to allow the use of a variety of materials. Drain holes may be added to the base 110 or the sidewalls 112 to regulate the moisture content of the roof planter 100. Such drain holes may be covered with mesh or other covering to help prevent the release of the growth medium 106 from the roof planter 100.

Lips or ledges may be added to the top edges of the sidewalls 112, to provide for a more stable platform for the nesting of roof planters 100 when positioned atop each other. The edges of the roof planter 100 may be of a configuration other than a straight edge, such that the edges may, for example, be rounded, beveled, or ridges, so long as the configuration does not destroy or interfere with the functioning and nesting of the roof planter 100. Further, the roof planter 100 may additionally incorporate features to aid in handling the roof planter, such as handles and grip. For instance, the sidewalls 112 may be shaped to incorporate handles, grips or grip holes, or such features may simply be attached to the roof planter 100. In addition, the growth medium 106 may consist of virtually any plant or plants that may be selected by the user.

The detailed description above illustrates the invention by way of example and not by way of limitation. This description clearly enables one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

The invention claimed is:

1. A roof planter comprising:
   a. a body configured for placement upon a roof, the roof comprising a roofing surface material, said surface material being produced by an identifiable manufacturer;
   b. a pad positioned between the body and the roof surface material; and
   c. vegetation retained by the body;
   wherein the pad comprises a material that is selected to be compatible with the surface material and is approved by the identifiable manufacturer for placement on the surface material.

2. The roof planter of claim 1, further comprising growth medium retained by the body, wherein the vegetation is planted in the growth medium.

3. The roof planter of claim 1, wherein the pad comprises: roof walk material.

4. The roof planter of claim 1, wherein the pad is attached to the body.

5. The roof planter of claim 4, further comprising more than one pad, wherein the body is a container having corners, and one of each said pads is positioned below each corner of the body.

6. The roof planter of claim 1, wherein the body comprises a base and two or more sidewalls attached to the base, the dimensions of said body being such that the base of a first body may fit at least in part within the sidewalls of a second body.

7. The roof planter of claim 6, wherein the sidewalls are tapered outward from the base to the top of the body.

8. The roof planter of claim 6, further comprising sidewall extensions attached to the sidewalls, the extensions forming a frame capable of receiving the base of a second roof planter.

9. The roof planter of claim 1, the body further comprising a grip, the grip being configured for use by a human hand.

10. The roof planter of claim 1, wherein the surface material is covered by a warranty issued by the manufacturer, and placement of the roof planter on the surface material does not invalidate the warranty.

11. In combination with a roof including a roofing surface material that is presented upwardly to provide a protective surface to the roof, a roof planter comprising:
    a. a body located over the surface material said surface material being produced by an identifiable manufacturer;
    b. at least one pad between the surface material and the body; and
    c. vegetation, the vegetation being retained by the body;
    wherein the pad comprises a material that is selected to be compatible with the surface material and is approved by the identifiable manufacturer for placement on the surface material.

12. The combination of claim 11, further comprising growth medium, the growth medium being retained by the body and the vegetation being planted in the growth medium.

13. The combination of claim 11, wherein the body is generally flat and comprises a base and sidewalls attached to the base, the dimensions of said body being such that the base of a first body may fit at least in part within the sidewalls of a second body.

14. The combination of claim 11, wherein the pad comprises roof walk material.

* * * * *